US008251665B2

(12) United States Patent
Baldauf et al.

(10) Patent No.: US 8,251,665 B2
(45) Date of Patent: Aug. 28, 2012

(54) TURBINE BLADE AND GAS TURBINE EQUIPPED WITH A TURBINE BLADE

(75) Inventors: Stefan Baldauf, Ismaning (DE); Hans-Thomas Bolms, Mülheim an der Ruhr (DE); Michael Händler, Erkrath (DE); Christian Lerner, Herten (DE)

(73) Assignee: Siemens Aktiengesellschaft, München (DE)

( * ) Notice: Subject to any disclaimer, the term of this patent is extended or adjusted under 35 U.S.C. 154(b) by 1135 days.

(21) Appl. No.: 10/585,955

(22) PCT Filed: Jan. 12, 2005

(86) PCT No.: PCT/EP2005/000226
§ 371 (c)(1),
(2), (4) Date: Oct. 3, 2008

(87) PCT Pub. No.: WO2005/068786
PCT Pub. Date: Jul. 28, 2005

(65) Prior Publication Data
US 2009/0016881 A1    Jan. 15, 2009

(30) Foreign Application Priority Data
Jan. 20, 2004   (EP) .................................... 04001108

(51) Int. Cl.
*F01D 5/18* (2006.01)
(52) U.S. Cl. ................................. 416/193 A; 416/96 R

(58) Field of Classification Search ................ 416/96 R, 416/97 R, 193 A, 224
See application file for complete search history.

(56) References Cited

U.S. PATENT DOCUMENTS

| 3,950,113 | A | * | 4/1976 | Albrecht ..................... 416/97 A |
| 3,967,353 | A | * | 7/1976 | Pagnotta et al. ........... 29/889.21 |
| 5,122,033 | A | * | 6/1992 | Paul ............................ 416/96 R |
| 5,244,345 | A |   | 9/1993 | Curtis |

FOREIGN PATENT DOCUMENTS

| DE | 26 28 807 A1 | 1/1977 |
| EP | 1 073 827 B1 | 2/2001 |
| WO | WO 99/60253 A1 | 11/1999 |

OTHER PUBLICATIONS

Krilov, "Theory of Flow Engines", 1972, pp. 83-84.

* cited by examiner

*Primary Examiner* — Edward Look
*Assistant Examiner* — Liam McDowell

(57) ABSTRACT

A turbine blade is presented including a vane that runs along a blade axis and a platform region, which is located at the root of the vane and has a platform that extends transversally to the blade axis. An improved cooling of a platform region and the transition region is provided from a turbine blade to a platform of a turbine blade. The platform includes a first platform wall that does not support the vane and a second platform wall that supports the vane. At the root of the vane and over the course of the transition region from the turbine blade to the platform, the first platform wall is aerodynamically curved and the course of the second platform wall has a receding shoulder in relation to the first platform wall, as a continuation of the vane.

7 Claims, 2 Drawing Sheets

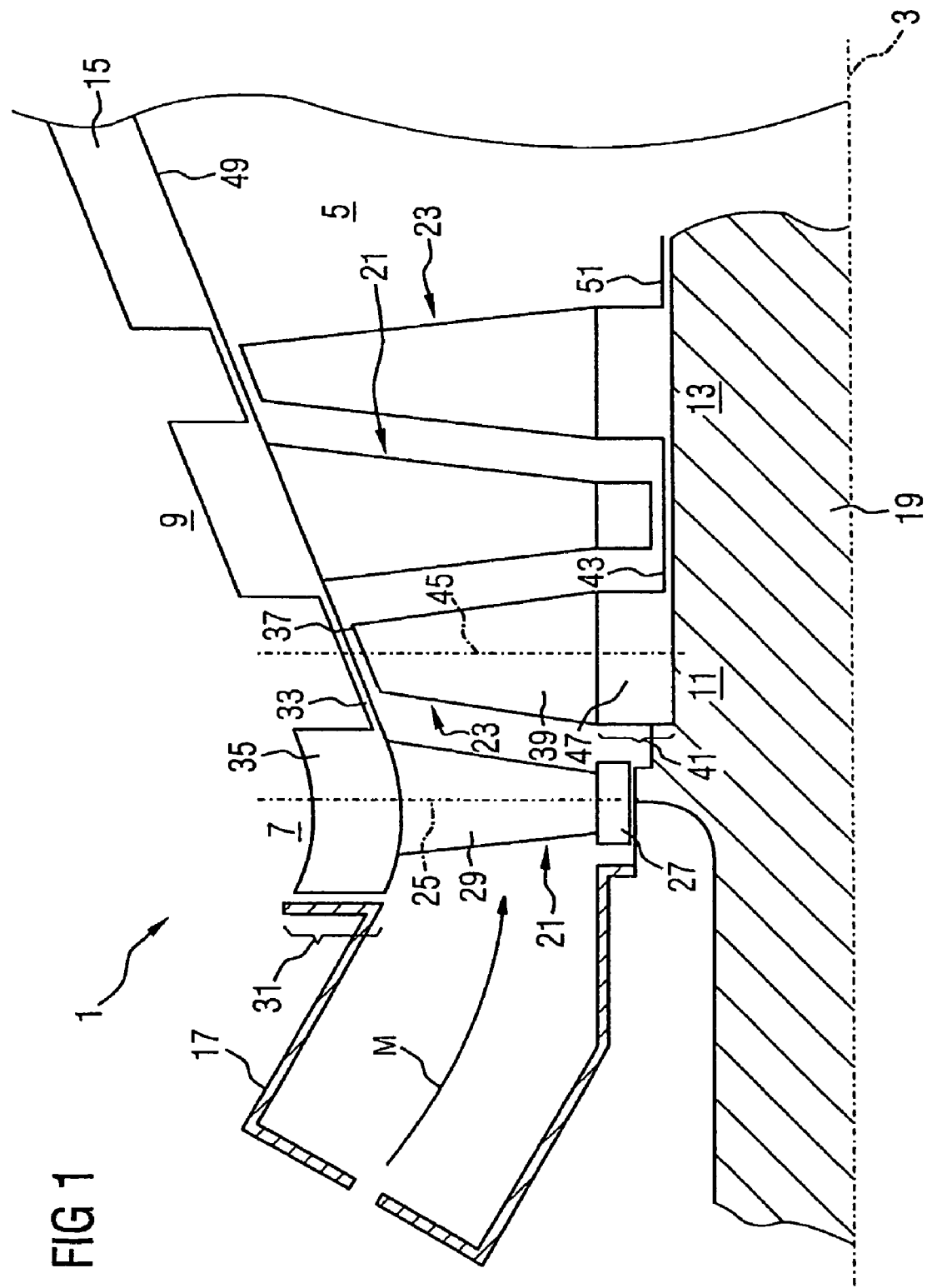

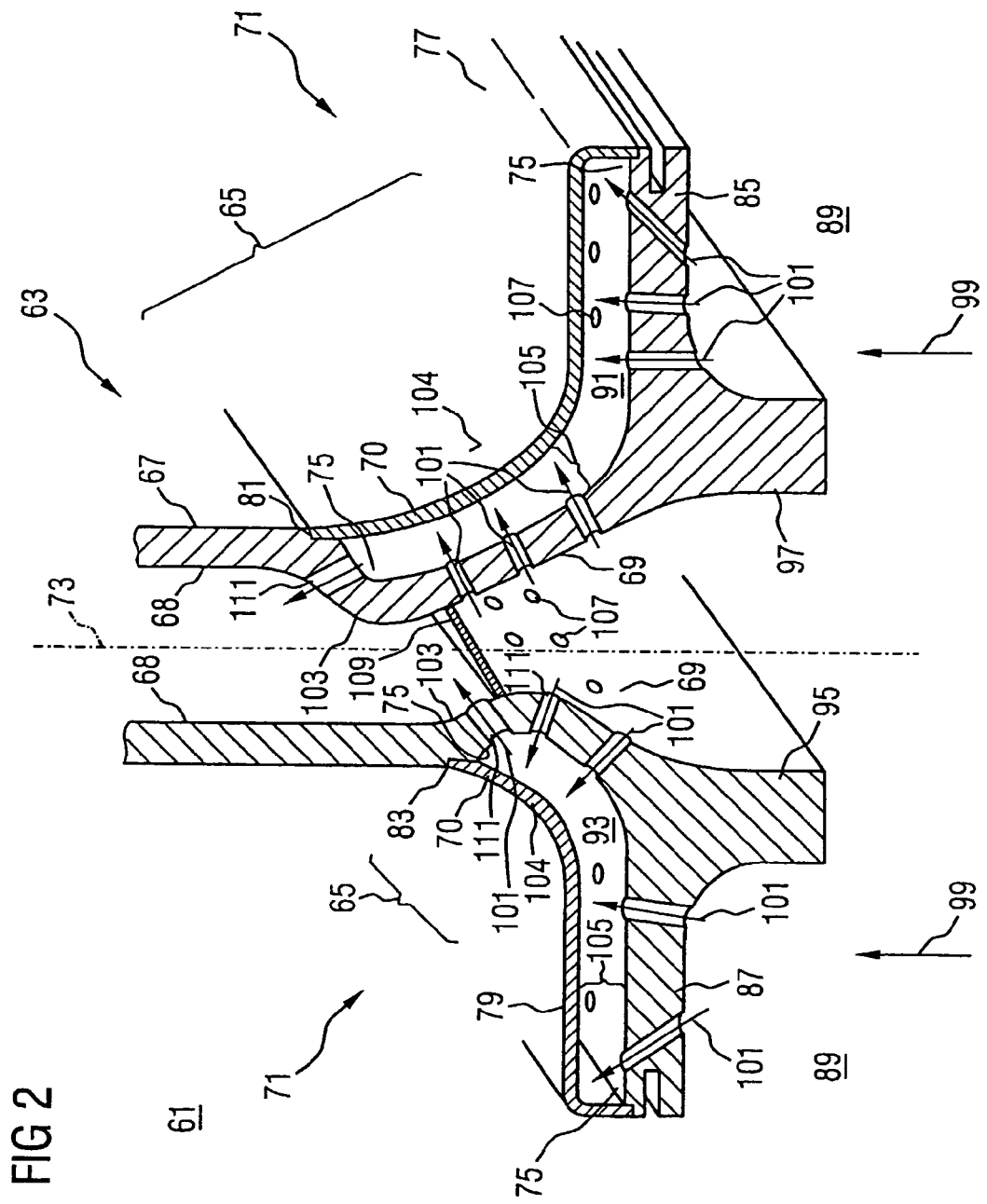

TURBINE BLADE AND GAS TURBINE EQUIPPED WITH A TURBINE BLADE

CROSS REFERENCE TO RELATED APPLICATIONS

This application is the US National Stage of International Application No. PCT/EP2005/000226, filed Jan. 12, 2005 and claims the benefit thereof. The International Application claims the benefits of European Patent application No. 04001108.2 filed Jan. 20, 2004. All of the applications are incorporated by reference herein in their entirety.

FIELD OF THE INVENTION

The invention relates to a turbine blade with a blade leaf arranged along a blade axis and with a platform region which, arranged at the root of the blade leaf, has a platform extending transversely with respect to the blade axis, the platform having a first platform wall not bearing the blade leaf and a second platform wall bearing the blade leaf. The invention also applies to a gas turbine with a flow duct extending along an axis of the gas turbine and having an annular cross section for a working medium, and with a second blade stage arranged downstream of a first along the axis, a blade stage having a number of annularly arranged turbine blades which extend radially into the flow duct.

BACKGROUND OF THE INVENTION

In a gas turbine of this type, temperatures which may lie in the range of between 1000° C. and 1400° C. occur in the flow duct after it has been acted upon by hot gas. The platform of the turbine blade, as a result of the annular arrangement of a number of such turbine blades of a blade stage, forms part of the flow duct for a working fluid in the form of hot gas which flows through the gas turbine and thereby drives the axial turbine rotor via the turbine blades. Such a high thermal stress on the flow duct boundary formed by the platforms is counteracted in that a platform is cooled from the rear, that is to say from the turbine blade root arranged below the platform. For this purpose, the root and the platform region conventionally have suitable ducting for action by a cooling medium.

An impact-cooling system for a turbine blade of the type initially mentioned may be gathered from DE 2 628 807 A1.

In DE 2 628 807 A1, to cool the platform, a perforated wall element is arranged upstream of that side of the platform which faces away from the hot gas, hence downstream of the platform, that is to say in between a blade root and the platform. Cooling air under the platform, that is to say in between a blade root and the platform. Cooling air under relatively high pressure impinges through the holes of the wall element onto that side of the platform which faces away from the hot gas, with the result that efficient impact cooling is achieved.

EP 1 073 827 B1 discloses a novel way of designing the platform region of cast turbine blades. The platform region is designed as a double platform consisting of two platform walls lying opposite one another. What is achieved thereby is that the platform wall directly exposed to the flow duct and consequently to the hot gas and delimiting the flow duct can be made thin. The design in the form of two platform walls results in a functional separation for the platform walls. The platform wall delimiting the flow duct is responsible essentially for the ducting of the hot gas. The opposite platform wall not acted upon by the hot gas takes over the absorption of the loads originating from the blade leaf. This functional separation allows the platform wall delimiting the flow duct to be made so thin that the ducting of the hot gas is ensured, without substantial loads in this case having to be absorbed.

Normally, in the platform region and in the root region of the blade leaf, between the blade leaf and platform, there is a predetermined relatively high accumulation of material in the case of conventional turbine blades on account of boundary conditions which are due ultimately to production by casting and to strength requirements as a result of the stress undergone by a turbine blade. Such a relatively high accumulation of material at the same time also impedes the outflow of heat from this region by means of cooling methods installed in the blade interior and also prevents the direct cooling of these regions by cooling medium. It is known, in order to cool these regions, to provide film cooling on the outer surface of a blade in the root region of the blade leaf and in the platform region. For this purpose, in the vicinity of these outer surfaces, a cooling film is applied from a corresponding open gap system to these boundaries of the flow duct acted upon by working medium in the form of hot gas. This is, in principle, a functioning solution for cooling the abovementioned platform and root regions with their relatively high accumulations of material. Nevertheless, to achieve this, a considerable amount of cooling air is necessary on account of the complicated secondary flow situation in the flow duct, where vortex configurations of the secondary flow may cause the cooling film to be lifted off and deflected away from said outer surfaces. Consequently, when a gas turbine is operating in reality, this known procedure may lead to an uncooled root region and platform region in these regions where access is difficult. An advantageous configuration of these regions would be desirable.

SUMMARY OF THE INVENTION

This is where the invention comes in, the object of which is to specify a turbine blade and a gas turbine, in which improved cooling in the root region of the blade leaf and platform region of a turbine blade and consequently improved cooling of the boundary of a flow duct of the gas turbine are provided.

The object is achieved, in terms of the turbine blade, by means of a turbine blade of the type initially mentioned, in which at the root of the blade leaf, along a transition from the blade leaf to the platform, the first platform wall has in its run an aerodynamic rounding, and the second platform wall has in its run, with respect to the first platform wall and in continuation of the blade leaf, a set-back step.

The invention proceeds from the consideration that the use of a thin-walled non-bearing platform wall for forming the boundary of a flow duct, which is acted upon by working medium in the form of hot gas in an operating state of a gas turbine, makes it possible to have a particularly advantageous configuration of the platform. The essential recognition of the invention is that, for such a double-walled platform with a first thin-walled non-bearing platform wall and with a second thicker-walled bearing platform wall, both the non-bearing and the bearing platform walls can be optimized in terms of their requirements.

According to the above consideration, the non-bearing platform wall is to be configured particularly in terms of its function of delimiting the flow duct. According to the invention, this platform wall has the profile of an aerodynamic rounding along the transition of the blade leaf to the platform. Such a measure is not provided in the abovementioned platform configuration of EP 1 073 827 B1. According to the above consideration, the rear side of the platform, that is to say the second bearing platform wall, is to be configured particularly in terms of its bearing function. It should make available an interspace for cooling the non-bearing platform wall. For this reason, according to the invention, the second platform wall has in its run, with respect to the first platform wall and in continuation of the blade leaf, a set-back step. Consequently, according to the present concept, the rear side of the first non-bearing platform wall remains free, and the bearing blade structure in the form of the second bearing platform wall is optimized in terms of configuration according to thermomechanical criteria, that is to say, on the one hand, the second platform wall forms the continuation of a blade leaf wall, virtually with a uniform thickness of the blade leaf wall, and, on the other hand, on account of the set-back step, the second platform wall makes available a sufficient interspace which can be acted upon by cooling medium for the non-bearing platform wall.

The thermal stress on the non-bearing first platform wall is reduced by means of the profile of an aerodynamic rounding, thus also reducing the cooling measures. The cooling measures themselves are optimized, in particular by the configuration of the bearing second platform wall and of said interspace, so that the region, also designated as a basket arch, between the root region of the blade leaf and the platform region can be cooled in an optimized manner at a low outlay.

The essential recognition of the invention is, therefore, that, by virtue of the proposed configuration of a transition between the blade leaf and the platform, on the one hand, material accumulations are as far as possible reduced, without the mechanical stability of a turbine blade being put at risk, and, on the other hand, as effective a cooling as possible is integrated in this transition.

Advantageous developments of the invention may be gathered from the subclaims and specify in detail advantageous possibilities for configuring the platform of the above turbine blade within the framework of the concept explained.

In a particularly preferred development of the invention, according to the procedure explained, an interspace for cooling the platform is formed between the rounding of the first platform wall and the step of the second platform wall. For this purpose, the interspace may suitably be selected, above all, with a view to an impact cooling of the first platform wall.

Expediently, the interspace has a uniform height defined along the entire run of the platform essentially by a height of the step. The advantage of this is that, on the one hand, an optimal routing of the cooling medium on the basis of fluid criteria is possible in the interspace. On the other hand, the height is selected such that the introduction of a cooling medium into the interspace through the second bearing platform wall allows an optimal impact cooling of the first non-bearing platform wall.

On account of different requirements, the second platform wall has a wall thickness which is greater than a wall thickness of the first platform wall. Preferably, the second bearing platform wall is designed with a wall thickness which corresponds essentially to the wall thickness at the root region of the blade leaf.

For the optimized cooling of the transition at the root of the blade leaf, the number of cooling passages per unit area is greater along the transition than in the remaining platform region. In this way, the entire rear face of the non-bearing platform wall, said face forming a direct boundary with the flow duct acted upon by hot gas, becomes accessible to optimized cooling measures.

According to a particularly preferred development of the invention, the first non-bearing platform wall is formed by a resiliently elastic sheet metal part lying against the blade leaf. The sheet metal part in this case lies preferably against a stop at the root of the blade leaf, which stop may be designed in the form of a groove or of an edge. The non-bearing platform wall thus has a thin-walled design such that, on account of the resilient elastic sheet metal part, its action as a boundary for the flow duct is not impaired by a relative movement of adjacent parts as a result of their flexibility. On account of the resilient elastic design of said platform wall, a particularly advantageously configured profile in the form of an aerodynamic rounding is possible.

Expediently, the platform is qualitatively identically designed in a first half on one side of the blade leaf and in a second half on the other side of the blade leaf. The platform therefore extends in qualitatively identical form on both sides of the blade leaf. It therefore has the same abovementioned features on one side as the other. In this way, by a number of turbine blades being lined up with one another in a blade stage, a boundary of the flow duct in terms of the above set object can be formed particularly advantageously.

The invention also applies to a gas turbine of the type initially mentioned, in which a blade stage has a number of annularly arranged turbine blades which extend radially into the flow duct and which are designed as explained above.

Expediently, a non-bearing first platform wall does not in any event have to be attached in the platform region, but, instead, releasable or loose lying against an extension in the root region of the turbine blade leaf or in the region of the bearing second platform wall is sufficient.

To be precise, during the rotary operation of a turbine blade in the form of a moving blade on an axial turbine rotor, a centrifugal force acting from the root of the blade leaf in the direction of the blade leaf is generated as a result of rotation. That is to say, during operation, the resilient elastic sheet metal part is pressed against the stop by the centrifugal force and is thereby fastened by centrifugal force.

Furthermore, during the operation of a turbine blade in the form of a guide blade on a peripheral turbine casing, a pressure drop from the root of the blade leaf in the direction of the blade leaf is generated by a cooling medium. That is to say, during operation, the resilient elastic sheet metal part is pressed against the stop by the pressure drop and is thereby fastened to the stop by pressure.

Within the framework of a refinement of the gas turbine, it proves advantageous that a boundary of the flow duct is formed, between a first turbine blade and an adjacent second turbine blade of the same blade stage, by a first resilient elastic sheet metal part of the first turbine blade and by a second resilient elastic sheet metal part of the second turbine blade. A radial boundary of the flow duct is thereby advantageously formed within a blade stage.

Within the framework of a further refinement of the gas turbine, it proves advantageous, furthermore, that a boundary of the flow duct is formed, between a first turbine blade of a first blade stage and a second turbine blade, arranged directly downstream of the first turbine blade axially, of a second blade stage, by a first resilient elastic sheet metal part of the first turbine blade and by a second resilient elastic sheet metal part of the second turbine blade. An axial boundary of the flow duct is thereby advantageously formed. The blade stages are advantageously guide blade stages and the turbine blades are guide blades.

This type of fastening of a non-bearing second platform wall has considerable advantages in the mounting and manufacture of a turbine blade and in equipping a gas turbine with such a turbine blade.

BRIEF DESCRIPTION OF THE DRAWINGS

Exemplary embodiments of the invention are described below with reference to the drawing. This is not intended to illustrate exemplary embodiments true to scale; on the contrary the drawing, where appropriate for an explanation, is in diagrammatic and/or slightly distorted form. With regard to additions to the teachings which can be recognized directly from the drawing, reference is made to the relevant prior art.

In particular, in the drawing:

FIG. 1 shows a particularly preferred embodiment of a gas turbine with a flow duct and with a preferred version of the guide and moving blading in diagrammatic form in a cross-sectional view, FIG. 2 shows a platform region of a particularly preferred embodiment of a first turbine blade of a first blade stage and of the second turbine blade, arranged directly downstream of the first turbine blade axially, of the second blade stage, in a perspective view.

DETAILED DESCRIPTION OF THE INVENTION

FIG. 1 shows a gas turbine 1 with a flow duct 5 extending along an axis 3 and having an annular cross section for a working medium M. A number of blade stages are arranged in the flow duct 5. In particular, a second guide blade stage 9 is arranged downstream of a first guide blade stage 7 along the axis 3. Furthermore, a second moving blade stage 13 is arranged downstream of a first moving blade stage 11. The guide blade stages 7, 9 in this case have a number of guide blades 21 arranged annularly on a peripheral turbine casing 15 and extending radially into the flow duct 5. A moving blade stage 11, 13 in this case has a number of moving blades 23 arranged annularly on an axial turbine rotor 19 and extending radially into the flow duct 5. The flow of a working medium M is in this case generated in the form of a hot gas by a burner 17. Correspondingly to the annular cross section of the flow duct 5, a number of such burners 17 are arranged around the axis 3 in an annular space not shown in the cross-sectional drawing of FIG. 1.

A guide blade 21 and a moving blade 23 are shown diagrammatically in FIG. 1. A guide blade 21 has a blade tip 27 arranged along a blade axis 25, a blade leaf 29 and a platform region 31. The platform region 31 has a platform 33 extending transversely with respect to the blade axis 25 and a blade root 35.

A moving blade 23 has a blade tip 37 arranged along a blade axis, a blade leaf 39 and a platform region 41. The platform region 41 has a platform 43 extending transversely with respect to the blade axis 45 and a blade root 47.

The platform 33 of a guide blade 21 and the platform 43 of a moving blade 23 in each case form part of a boundary 49, 51 of the flow duct 5 for the working medium M which flows through the gas turbine 1. The peripheral boundary 49 is in this case part of the peripheral turbine casing 15. The rotor-side boundary 51 is in this case part of the turbine rotor 19 which rotates in the operating state of the gas turbine 1.

As indicated diagrammatically in FIG. 1 and as shown in detail in FIG. 2, in this case the platform 33 of a guide blade 21 and the platform 43 of a moving blade 23 are formed by a resilient elastic sheet metal part lying against the blade leaf 29, 39.

FIG. 2 shows, to represent a platform region 31, 41, a platform region 61. The turbine blade 63 shown in FIG. 2 in this case represents a guide blade 21 of a first guide blade stage 7 or a second guide blade stage 9. The turbine blade 63 is also shown to represent a moving blade 23, shown in FIG. 1, of a first moving blade stage 11 or of a second moving blade stage 13. The turbine blade 63 is preferably a guide blade.

The turbine blade 63 has a blade leaf 67 depicted in truncated form. The platform region 61 has formed in it, at the root of the blade leaf 67, a platform 71 which extends transversely with respect to the blade axis 73. In this case, the platform 71 is formed, on the one hand, by a first platform wall 70 not bearing the blade leaf 67 and, on the other hand, by a second platform wall 69 bearing the blade leaf.

The first non-bearing platform wall 70 is formed, on the one hand, by a first resilient elastic sheet metal part 77 and, on the other hand, by a second resilient elastic sheet metal part 79. The first resilient elastic sheet metal part 77 lies against a first stop 81 on one side of the blade leaf 67. The second resilient elastic sheet metal part 79 lies against a second stop 83 on the other side of the blade leaf 67. The first stop 81 and the second stop 83 are in this case each designed in the form of a groove, into which in each case the first resilient elastic sheet metal part 77 and the second resilient elastic sheet metal part 79 butt in each case with its edge ending at the blade leaf 67. Furthermore, the first resilient elastic sheet metal part 77 and the second resilient elastic sheet metal part 79 are held at a further stop 85, 87 of the turbine blade 63. In the present embodiment, the first resilient elastic sheet metal part 77 and the second 79 are in each case attached to the stop 85, 87. Alternatively or additionally, the resilient elastic sheet metal parts 77, 79, in each case also engage behind the further stop 85, 87.

To be precise, a boundary of the flow duct 5 is formed in the way outlined above between the turbine blades 21, 23 of a first 7, 11 and a second 9, 13 blade stage by resilient elastic sheet metal parts 77, 79. In this way, the use of a thin-walled non-bearing platform 71 for producing the boundary of the flow duct in the form of a first resilient elastic sheet metal part 77 and of a second resilient elastic sheet metal part 79 makes it possible at the same time for the resilient elastic sheet metal parts 77, 79 to act as a sealing element. A sealing element of this type is at the same time sufficiently flexible to allow relative movements of adjacent turbine blades, and nevertheless has a sufficient sealing action. This avoids the need for a sealing element, such as would have been necessary for the sealing off of parting planes in platforms conventional hitherto. Potentially high-risk, structurally and thermally unfavorable lines for receiving such a sealing element are consequently avoided. On the rear side 89 of the platform 71, a first cooling space 91 and a second cooling space 93 in the form of an interspace are produced, which make it possible to cool the platform 71 optimally in the region of the root of the turbine blade 63 in the transition from the blade leaf 67 to the platform 71. A platform edge design which otherwise normally has a complicated configuration can thereby be configured more simply and without a thermally high-risk region. To assist the cooling in the cooling spaces 91, 93, the bearing structure 95, 97, starting from the root of the blade leaf 67, of the blade 63 is continued, optimized in configuration, to the blade root not shown here (reference symbols 35, 47 in FIG. 1), in order to assist the cooling measures.

The fastening of the first resilient elastic sheet metal part 77 and of the second resilient elastic sheet metal part 79 to the stops 81, 83, 85, 87 arises, depending on the type of operation of the turbine blade 63 in the form of a guide blade 21 shown in FIG. 1 or in the form of a moving blade 23 shown in FIG. 1, ultimately when the turbine blade 63 is in operation in the gas turbine 1. To be precise, during the rotary operation of the turbine blade 63 in the form of a moving blade 23 on a turbine rotor 19, a centrifugal force acting from the root of the blade leaf 67 in the direction 99 of the blade leaf 67 is generated as a result of rotation. There is also, in addition, a pressure drop, as in the case of a guide blade 21.

During the operation of a turbine blade 63 in the form of a guide blade 21, shown in FIG. 1, on a peripheral turbine casing 15, a pressure drop from the root of the blade leaf 67 in the direction of the blade leaf 67 is generated from the rear side 89 of a platform 71 by a cooling medium.

The direction 99 of an abovementioned centrifugal force of a moving blade 23 and the direction 99 of the pressure drop for a guide blade 21 are indicated in FIG. 2 by the arrow 99. Depending on the design of the turbine blade 63 as a moving blade 23 or as a guide blade 21, therefore, the platform 71 in the form of the resilient elastic sheet metal parts 77, 79 is pressed against the stops 81, 83 by the centrifugal force or by the pressure drop. Thus, the resilient elastic sheet metal parts 77, 79 of the platform 71 are fastened by centrifugal force or fastened by pressure and at the same time deploy their separating action between the flow duct 5 acted upon by hot gas and the rear side 89, acted upon by a cooling medium, of the platform 71.

The bearing second platform wall 69 of the platform 71 has a bearing structure optimized in configuration and, by virtue of its configuration, makes it possible to have an easily accessible and cooled platform, even at its edges 75. At the root of the blade leaf 67, the transition from the blade leaf 67 to the platform 71 is also designated as a basket arch region.

Along this transition 65, the first platform wall 70 has an aerodynamic rounding 104. The corresponding resilient elastic sheet metal parts 77, 79, on account of their flexible design, can be optimally adapted in terms of their curvature at the transition 65 to the conditions and loads which prevail there. In particular, this aerodynamically adapted rounding 104 relates not only to the flow of working medium on the hot-gas side, but also to the flow of the cooling fluid 101 on the rear side 89 of the platform 71 and in the cooling spaces 91, 93. The wall thickness of the first platform wall 70 is substantially smaller than that of the second platform wall 69. The second bearing platform wall 69 has in its run, at the transition 65, with respect to the first platform wall 70 and in continuation of a blade leaf wall 68 of the blade leaf 67, a set-back step 103. In this case, the wall thickness of the blade leaf wall 68 is essentially maintained. Thus, the cooling spaces 91, 93 for cooling the platform 71 are formed as interspaces. The height 105 of the cooling spaces 91, 93 is defined essentially by the height of the step 103.

A greater number of cooling passages 107 per unit area are arranged in the basket arch region 65 than in the platform region. This leads to an optimally cooled basket arch region. The precondition for this is, inter alia, the aerodynamically advantageous rounding 104 of the first non-bearing platform wall 70 and the run of the step, set back with respect to the first platform wall 70, in continuation of the blade leaf wall 68 in the form of the bearing second platform wall 69. Owing to the increased number of cooling passages 107 at the transition 65, the accumulation of material in the basket arch region is also advantageously kept as low as possible.

The routing of the cooling medium 101 is indicated by arrows in FIG. 2. The cooling medium 101 in this case is first routed from the rear side 89 of the platform 71 into the platform region 61 and into the basket arch region 65, that is to say is not supplied directly for blade leaf cooling. For this purpose, a corresponding web 109 is arranged inside the blade leaf 67 between the second platform walls 69, approximately level with the step 103. The cooling medium 101 used for cooling the basket arch region 65 is reused, instead, for cooling the blade leaf 67. For this purpose, in the upper part of the basket arch region 65, toward the root region of the blade leaf 67, a further cooling-air port 111 is provided, through which the cooling medium 101 flows into the interior of the blade leaf 67.

In summary, in order to ensure improved cooling of a platform region and of a transition 65 of a blade leaf 67 to a platform 71 of a turbine blade 63 and consequently the cooling of a boundary of a flow duct 5 of a gas turbine 1, in the case of a turbine blade 63 with a blade leaf 67 arranged along a blade axis 73 and with a platform region 61 which, arranged at the root of the blade leaf 67, has a platform 71 extending transversely with respect to the blade axis 73, the platform 71 having a first platform wall 70 not bearing the blade leaf 67 and a second platform wall 69 bearing the blade leaf 67, according to the proposed concept, at the root of the blade leaf 67, along a transition 65 from the blade leaf 67 to the platform 71, the first platform wall 70 has in its run an aerodynamic rounding 104, and the second platform wall 69 has in its run, with respect to the first platform wall 70 and in continuation of the blade leaf 67, a set-back step 103.

The invention claimed is:

1. A turbine blade, comprising:
a blade leaf arranged along a blade axis having a blade tip, a root opposite the tip, a suction side and a pressure side;
a platform region arranged at the root of the blade leaf;
a platform arranged at the platform region having a width and extending transversely with respect to the blade axis;
a first platform wall arranged along the transition from the blade leaf to the platform that does not structurally support the blade leaf and has along the width of the platform an aerodynamic shape; and
a second platform wall arranged in the platform region that structurally supports and is continuous with the blade leaf and has, along the width of the platform, a set-back step with respect to the first platform,
wherein an interspace for cooling the platform is formed between the aerodynamic shape of the first platform wall and the set-back step of the second platform wall, and
wherein the interspace has a uniform height defined along the entire width of the platform by a height of the set-back step.

2. The turbine blade as claimed in claim 1, wherein the second platform wall thickness is greater the first platform wall thickness.

3. The turbine blade as claimed in claim 1, wherein the second platform wall has a plurality of cooling passages per unit area greater along the transition from the blade leaf to the platform than in the remainder of the platform region.

4. The turbine blade as claimed in claim 1, wherein the first platform wall is formed by a resilient elastic sheet metal part arranged adjacent the blade leaf.

5. The turbine blade as claimed in claim 1, wherein the platform extends on both the pressure and suction sides of the blade leaf.

6. A gas turbine, comprising:
a flow duct extending along an axis of the turbine having an annular cross section for a working medium; and
a plurality of blade stages having a plurality of annularly arranged turbine blades that extend radially into the flow duct arranged one after another along the axis of the turbine, wherein each turbine blade comprises:
a blade axis perpendicular to the turbine axis,
a blade tip,
a blade root arranged radially opposite the blade tip,
a blade platform arranged adjacent to the blade root and extending transverse to the blade axis,
a blade profile having an airfoil shape arranged between the blade tip and the blade root, wherein:
a first platform wall formed from a resilient elastic metal sheet arranged along a transition from the blade profile to the blade platform that does not structurally support the blade profile and has along a width of the platform an aerodynamically advantageous curved shape, and
a second platform wall arranged along a transition from the blade profile to the blade platform that structurally supports and is continuous with the blade profile and has, along the width of the platform, a set-back step with respect to the first platform and a retaining stop to retain the first platform wall,
wherein during the rotary operation of a rotating turbine blade a centrifugal force acting radially outward from the root of the blade profile toward the blade tip is generated as a result of the blade rotation, the resilient elastic sheet metal first platform wall is pressed against the retaining stop by the centrifugal force and is fastened in place by centrifugal force.

7. A gas turbine, comprising:
a flow duct extending along an axis of the turbine having an annular cross section for a working medium; and
a plurality of blade stages having a plurality of annularly arranged turbine blades that extend radially into the flow duct arranged one after another along the axis of the turbine, wherein each turbine blade comprises:
a blade axis perpendicular to the turbine axis,
a blade tip,
a blade root arranged radially opposite the blade tip,
a blade platform arranged adjacent to the blade root and extending transverse to the blade axis,
a blade profile having an airfoil shape arranged between the blade tip and the blade root, wherein:
a first platform wall formed from a resilient elastic metal sheet arranged along a transition from the blade profile to the blade platform that does not structurally support the blade profile and has along a width of the platform an aerodynamically advantageous curved shape, and
a second platform wall arranged along a transition from the blade profile to the blade platform that structurally supports and is continuous with the blade profile and has, along the width of the platform, a set-back step with respect to the first platform and a retaining stop to retain the first platform wall,
wherein during the operation of a turbine blade in the form of a stationary guide blade, a pressure drop from the blade root toward the blade tip is generated by a cooling medium, the resilient elastic sheet metal first platform wall is pressed against the retaining stop by the pressure drop and thereby fastened by the resulting pressure.

* * * * *